US 8,258,909 B2

(12) United States Patent
Li et al.

(10) Patent No.: US 8,258,909 B2
(45) Date of Patent: Sep. 4, 2012

(54) FOLDABLE POLYMER-BASED COIL STRUCTURE AND METHOD FOR FABRICATING THE SAME

(75) Inventors: Wen Li, Pasadena, CA (US); Damien C Rodger, Los Angeles, CA (US); Yu-Chong Tai, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 206 days.

(21) Appl. No.: 12/106,296

(22) Filed: Apr. 19, 2008

(65) Prior Publication Data

US 2008/0262611 A1  Oct. 23, 2008

Related U.S. Application Data

(60) Provisional application No. 60/926,021, filed on Apr. 23, 2007.

(51) Int. Cl.
*H01F 5/00* (2006.01)
*H01F 27/28* (2006.01)
(52) U.S. Cl. ............... 336/200; 336/223; 336/232
(58) Field of Classification Search ........... 336/200, 336/223, 232
See application file for complete search history.

(56) References Cited

U.S. PATENT DOCUMENTS 6,000,128 A * 12/1999 Umeno et al. ............. 29/846
6,222,437 B1 * 4/2001 Soto et al. ................. 336/200
7,199,682 B2 * 4/2007 Ezzeddine ................. 333/177
2003/0052767 A1 * 3/2003 Yamanobe et al. ......... 336/232
2004/0145442 A1 * 7/2004 Matsutani et al. .......... 336/200
2006/0121639 A1 * 6/2006 Tai et al. ................... 438/49

OTHER PUBLICATIONS

Jae Y. Park et al., *High Q spiral-type microinductors on silicon substrates*, IEEE Transactions on Magnetics, vol. 35, No. 5, [1999] 3544-3546.
Herbert Dwight, *Electrical Coils and Conductors*, McGraw Hill Book Company, 1945, ch 31, p. 267.
Y. C. Tai, et al., *Flexible MEMS skins: technologies and applications*, Proceedings. Pacific Rim MEMS Workshop, Xiamen, China, 2002.
Hong-seok Noh et al., *Water bonding using microwave heating of parylene intermediate layers*, Journal of Micromechanics and Microengineering, vol. 14. [2004] 625-631.
Hong-seok Noh et al, *Parylene micromolding, a rapid and lost-cost fabrication method for parylene microchannel*, Sensors and Actuators B, vol. 102 [2004] 78-85.
Damien C. Rodger et al., *Scalable high lead-count parylene package for retinal prostheses*, Sensors and Actuators B, vol. 117 [2006] 107-114.
Gerald E. Loeb, et al., *The BION devices: injectable interfaces with peripheral nerves and muscles*, Neurosurg. Focus, vol. 20 [May 2006].

* cited by examiner

*Primary Examiner* — Mohamad Musleh
*Assistant Examiner* — Ronald Hinson
(74) *Attorney, Agent, or Firm* — Bingham McCutchen LLP

(57) ABSTRACT

A foldable polymer-based coil structure and a method for fabricating the same are disclosed. The coil structure has metal wirings and interconnections between the wirings. The wirings and connections are embedded by a polymer. The coil structure is foldable in two or more layers. In the folded condition, coils of one layer overlap the coils of another layer. A stackable structure and jigs for aligning the foldable and stackable structures are also disclosed.

18 Claims, 6 Drawing Sheets

FOLDABLE POLYMER-BASED COIL STRUCTURE AND METHOD FOR FABRICATING THE SAME

CROSS REFERENCE TO RELATED APPLICATIONS

This application claims priority to U.S. Provisional Application 60/926,021 filed on Apr. 23, 2007, the contents of which are incorporated herein by reference in their entirety.

STATEMENT OF GOVERNMENT INTEREST

The U.S. Government has certain rights in this invention pursuant to Grant No. EEC0310723 awarded by National Science Foundation.

FIELD

The present disclosure relates to coils. More in particular, it relates to a foldable polymer-based coil structure and a method for fabricating such coil. The coil structure of the present disclosure is suitable for radiofrequency (RF) operation.

BACKGROUND

Inductive coupling between a pair of coils is a very promising technology for wireless power and data transmission to implantation components in many biomedical applications. For a retinal prosthesis specifically, a receiving coil with high self-inductance and low series resistance (i.e., high Q) is needed to optimize the efficiency of the system. However, thin film coils made by existing conventional planar micromachining technology cannot achieve this requirement due to geometrical restrictions. Some techniques, such as electroplating and suspended structures (see, for example, Jae Y. Park and Mark G. Allen, *High Q spiral-type microinductors on silicon substrates*, IEEE Transactions on Magnetics, Vol. 35, NO. 5, (1999) 3544-3546), have been developed to make high-Q coils, but the processes are usually expensive, complicate, and unreliable.

FIG. 1 shows the concept of a telemetry system used for biomedical applications by way of an equivalent circuit of an electromagnetically coupled system. The primary coil ($L_1$) is outside the human body, and thus has fewer design constraints such as physical sizes and power consumption. Therefore, the power transfer efficiency of this system mainly depends on the intrinsic characteristics of the receiving coil ($L_2$). The intrinsic characteristics of a planar circular coil, i.e., the self-inductance $L_s$ and series resistance $R_s$, can be calculated by its geometrical factors, as shown in equation (1) and (2).

$$L_s = 2\pi d N^2 \times 10^{-9} \left[ \left(\ln\frac{4d}{t}\right)\left(1 + \frac{t^2}{24d^2}\cdots\right) - \frac{1}{2} + \frac{43t^2}{288d^2}\cdots \right] \text{ (Henries)}, \quad (1)$$

$$R_s = \rho \frac{L}{A_c} \text{ (Ohm)} \quad (2)$$

Where $L_s$ is the self-inductance, N is the number of turns, d (in cm) is the mean diameter of the coil, t (in cm) is the coil width, $R_s$ is the series resistance, $\rho$ is the metal resistivity, L is the total wire length, and $A_c$ is the cross section area of the metal wire. See, for example, Herbert Dwight, *Electrical Coils and Conductors*, McGraw Hill Book Company, 1945, ch 31, p 267. With these known parameters, the intrinsic Q-factor, which represents the efficiency of an inductor, is defined by the following formula, where ω is the angular resonant frequency of the AC signal (i.e., $2\pi \times 1$ MHz for the current system), $$Q_t = \frac{\omega L_s}{R_s} \quad (3)$$

Theoretically, the higher the Q-factor, the more efficiently the coil performs. That means the power transfer efficiency of the system can be improved significantly by both increasing the self-inductance and lowering the series resistance of the receiving coil. Therefore, multiple layers of metal and thick metal are more desirable, but in reality this is difficult to fabricate using conventional micromachining techniques.

Y. C. Tai, F. Jiang, Y. Xu, M. Liger, S. Ho and C. M. Ho, *Flexible MEMS skins: technologies and applications*. Proceedings, Pacific Rim MEMS Workshop, Xiamen, China, 2002 describes a shear-stress sensors array integrated on a flexible polymer thin film, fabricated with a parylene/metal thin film technology.

SUMMARY

According to a first aspect, a foldable polymer-based coil structure is provided, comprising: a metal wiring arrangement comprising coils and at least one interconnection between the coils; and a polymer coating embedding the coils and the at least one interconnection, wherein the at least one interconnection and a portion of the polymer coating embedding the at least one interconnection define at least one foldable region configured to be folded to obtain a folded layered structure where the coils overlap each other.

According to a second aspect, a method for fabricating a foldable polymer-based coil structure is provided, comprising: providing a first polymer layer; depositing a first metal layer on the first polymer layer; patterning the first metal layer to form at least one metal interconnection; depositing a second polymer layer on the patterned first metal layer; patterning the second polymer layer to open the at least one metal interconnection; depositing a second metal layer on the patterned second polymer layer, the second metal layer contacting the opened at least one interconnection; patterning the second metal layer to form conductive wires; depositing a third polymer layer on the patterned second metal layer; and patterning the third polymer layer to define an embedded coil structure, the embedded coil structure comprising the conductive wires connected though the at least one interconnection.

According to a third aspect, a polymer-based coil stack comprising a plurality of coil structures stacked on each other is provided, each coil structure comprising: a metal wiring arrangement comprising a coil; a horizontal interconnection via connected with coil; a metal contact connected with the horizontal interconnection via; a polymer coating embedding the coil and the horizontal interconnection via; and a vertical interconnection via for connection to other coil structures of the stack.

Further embodiments of the present disclosure are provided in the written specification, drawings and claims.

A first advantage of the device and method of the present disclosure is that of providing high-Q coils with multiple layers of metal that can be fabricated without using electroplating technology.

A second advantage of the present disclosure is that the skins obtained in accordance with the present disclosure can be folded or stacked, and bonded together using a post fabrication thermal bonding process.

A third advantage is that the devices fabricated in accordance with the present disclosure are flexible and foldable, which can help to prevent any undesired degradation or mechanical damage in the region of implantation.

Additionally, according to some of its embodiments, the overall device is sealed by parylene, which makes it biocompatible. Moreover, although the device is specifically designed for intraocular retinal prostheses, it can be used in other biomedical applications which use wireless power and data transmission, such as micro stimulators for paralyzed muscle stimulation.

The device can be completely made using micromachining steps, which has many advantages over traditional fabrication approaches for bioimplantable coils, such as smaller size, precise dimensional control, and feasibility for system integration.

DETAILED DESCRIPTION

Figure 2:
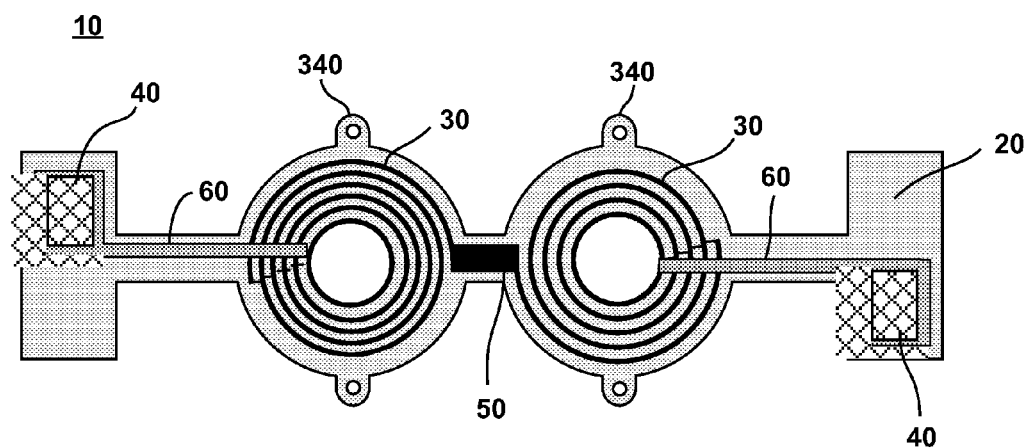
FIG. 2 shows a top view of a polymer/metal thin film skin before folding and bonding.
Figure 3:
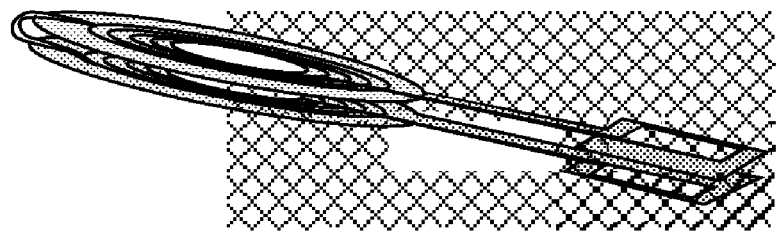
FIG. 3 shows a perspective view of the skin of FIG. 2 when folded into two layers.
Figure 4:
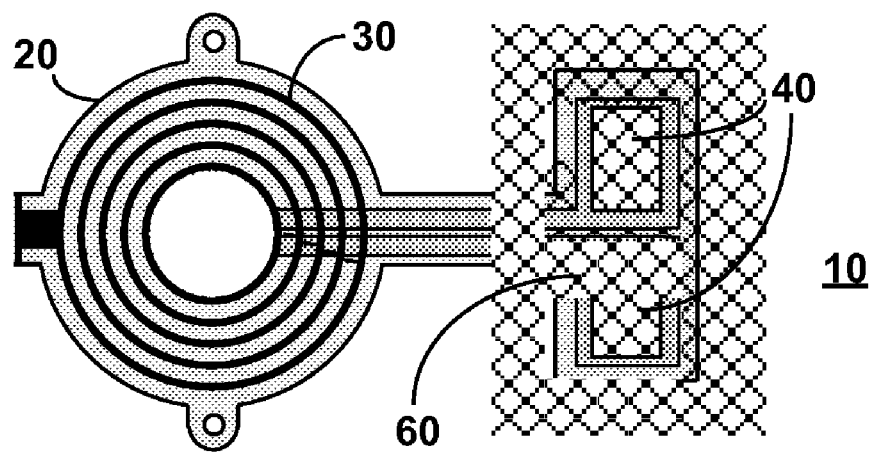
FIG. 4 shows a top view of the skin when fused into one piece after bonding.

FIGS. 2-4 provide views of the foldable polymer-metal device according to the present disclosure to be used as an RF (radiofrequency) coil, which is targeted to solve the above discussed problem encountered in current high-Q coil manufacturing. Preferably, a parylene-based skin is provided, comprising two buried layers of metal made using parylene/metal thin film technology. Parylene is the generic name for members of a polyxylene polymer series. The basic member of this series, called parylene N, is poly-para-xylylene. Parylene C is produced from the same monomer modified only by the substitution of a chlorine atom for one of the aromatic hydrogens. Parylene C has very unique properties, including flexibility (an elongation break of about 200%) and mechanical strength (Young's modulus about 4 GPa), chemical inertness. United States Pharmacopoeia (USP) Class VI biocompatibility, and lower water permeability compared with other materials, such as polymide. Moreover, parylene C deposition is conformal, room temperature CVD coating. With a given thickness, parylene—and in particular parylene C—has better flexibility and mechanical strength than other common used polymers, such as polymide and PDMS.

FIG. 2 shows a top view of a parylene/metal thin film skin structure (10) comprising parylene C (20), metal coils (30) and metal contacts (40). The preferable thickness range is from 1 micron to 30 microns. The term "skin" indicates a very thin, flexible and biocompatible polymer-based film. As better shown later in FIGS. 7($a$)-7($i$) and in particular in FIG. 7($i$), the parylene coating embeds the metal wires (30) with the metal contacts (40) opened. Turning to FIG. 2, thin film skin structure (10) also comprises coil interconnection vias (50) to connect the metal coils (30) with each other and contact, interconnection vias (60) to connect each coil (30) to a respective metal contact (40).

The metal structure (10) shown in FIG. 2 is a two-layered metal structure, where one layer of metal is for building the inductor conductive wires (30) and a second layer of metal is used for making the interconnections (50) between the conductive wires (30) and for forming the return leads or contact interconnection vias (60) to other components by way of the metal contacts (40).

The structure shown in FIG. 2 is symmetrical, so that it can be folded to form a two-layered structure. FIG. 3 shows a perspective view of the structure (10) of FIG. 2 when folded. This thin film skin can be easily folded into two layers thanks to the flexibility of parylene C (Young's modulus about 4 GPa).

Figure 1:
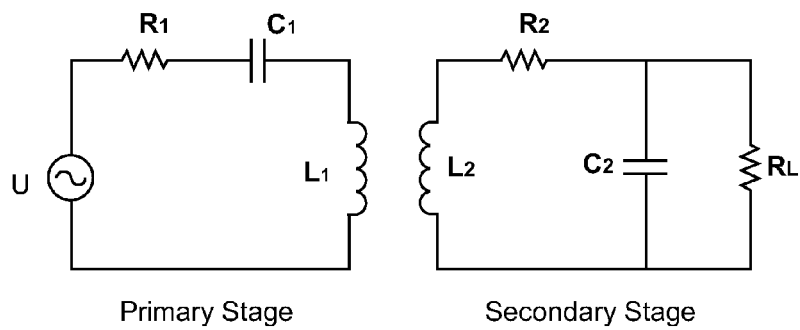
FIG. 1, already described above, shows an equivalent circuit of an electromagnetically coupled telemetry system used for biomedical applications.

FIG. 4 shows a top view of the skin when fused into one piece after thermal bonding. In particular, a post fabrication heat treatment is applied to the folded skin to bond together the separate layers into a whole piece. By varying the geometrical design, this technology can be easily extended to multiple layers. For example, before folding, vertical interconnects can be designed together with in-plane coils with alternating orientations between adjacent layers. After folding, all conductive wires will follow the same direction. Multi-layered structures allow to obtain higher values of L2 (FIG. 1) as needed.

Figure 5:
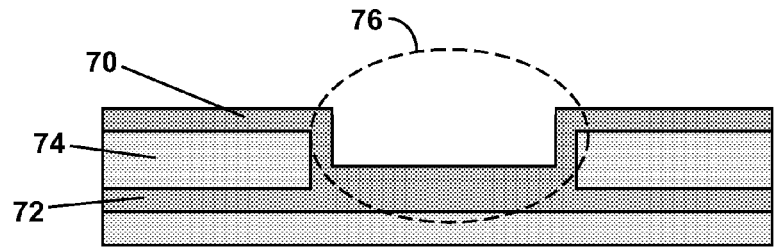
FIG. 5 is a cross-sectional view showing an example of vertical interconnect or interconnection via suitable with the present disclosure.

FIG. 5 is a cross-sectional view showing an example of vertical interconnect or interconnection via suitable with the present disclosure. A top layer of metal (70) is located above a bottom layer of metal (72). In regions not corresponding to the vertical interconnection vias, a parylene insulating layer (74) is present between layers (70) and (72). On the other hand, a vertical interconnection via (76) is created by contacting the top layer of metal (70) with the bottom layer (72) as shown in the figure.

Figure 6:
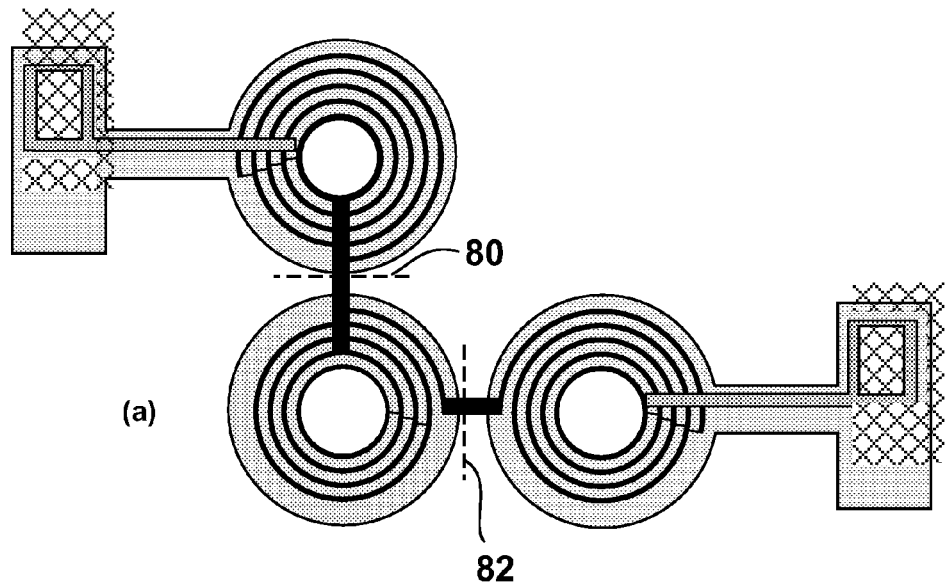
FIG. 6 is a top view showing a three-layered structure, where FIG. 6($a$) shows the structure before folding, while FIG. 6($b$) shows the structure after folding.
Figure 6:
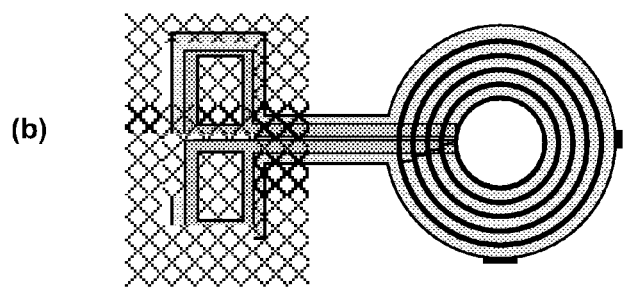

FIG. 6 is a top view showing an example of three-layered structure. In particular, FIG. 6($a$) shows the structure before folding, while FIG. 6($b$) shows the structure after folding. The structure of FIG. 6($a$) is folded along lines (80) and (82) of FIG. 6($a$).

Figure 7:
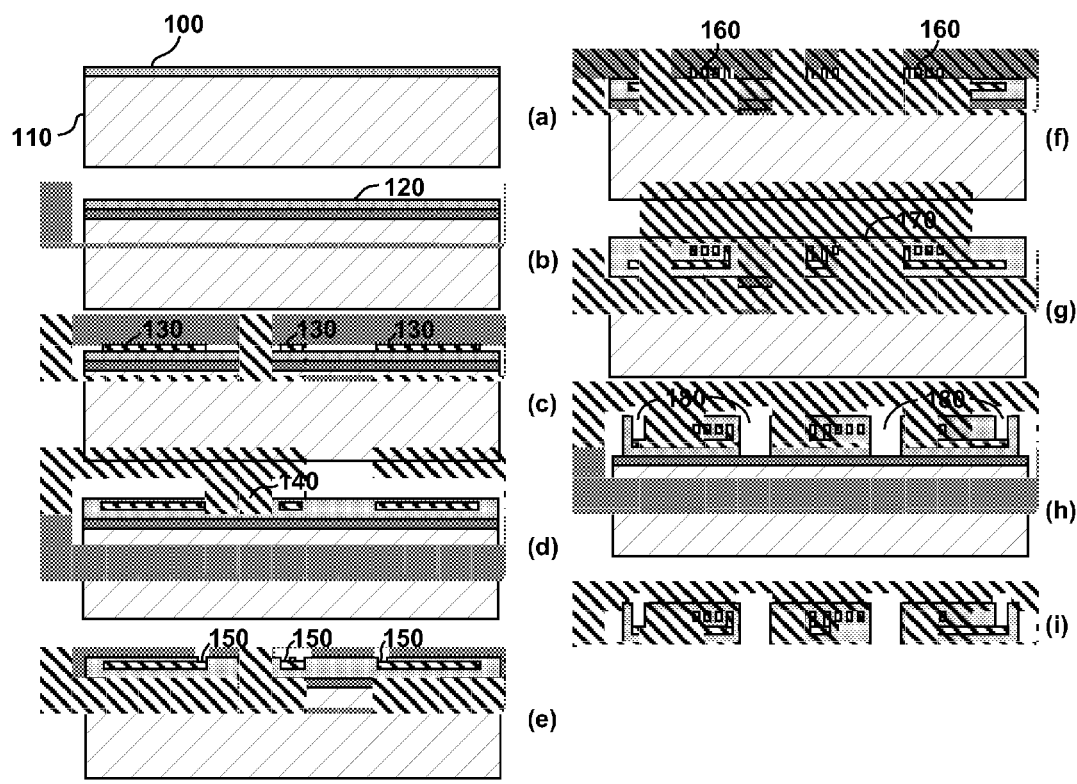
FIGS. 7($a$) to 7($i$) show cross sectional views of fabrication steps of the foldable polymer-based coil.

FIGS. 7($a$) to 7($i$) show cross sectional views of fabrication steps of the foldable parylene-based coil shown in FIGS. 2 to 4.

FIG. 7($a$) shows a first step where a silicon wafer (110) is provided and sacrificial layer of photoresist (100) is spin coated on the silicon wafer (110). Other substrates, such as glass substrates, can also be used.

FIG. 7($b$) shows a second step where a first layer of polymer such as parylene (120) is deposited on the photoresist (100).

FIG. 7(c) shows a third step where metal layer, such as a Ti/Au multilayer (a layer of Ti, e.g. a 20 nm Ti layer, serving as adhesion layer, followed by a layer of Au), is deposited on the parylene layer (120) and then patterned to form metal interconnections and return leads (130). Patterning of the metal can occur by way of wet etching. The metal interconnections and return leads (130) correspond to the first metal layer of the two-layered structure discussed with reference to FIG. 2. In particular, they correspond to the interconnections (50) and leads (60) shown in FIG. 2.

FIG. 7(d) shows a fourth step where a second parylene layer (140) is deposited above the structure of FIG. 7(c) to provide insulation between the two layers of metal of the present disclosure, i.e. 1) the layer of metal to build the interconnections and leads (130) and 2) the layer of metal to build the coil wires (160) and (30), see also FIG. 7(f).

FIG. 7(e) shows a fifth step where pattern transfer is performed on the parylene layer and the parylene layer (140) is etched to open interconnection vias (150) between the metal layers. Etching can occur, for example, by way of $O_2$ plasma etching using a photoresist mask. Pattern transfer refers to a technique in which a photoresist mask is coated and patterned on top of parylene to protect selective areas when etching down into parylene. With this technique, the patterns on the photoresist can be transferred into parylene.

FIG. 7(f) shows a sixth step where a second layer of metal, such as Ti/Au, is deposited and patterned to form the conductive wires (160) of the coil. Patterning can occur, for example, by wet etching. The second layer of metal corresponds to the layer of metal for building the inductor conductive wires (30) of FIG. 2.

FIG. 7(g) shows a seventh step where a further parylene coating (170) is provided, to seal the whole structure.

FIG. 7(h) shows an eighth step where the parylene is patterned (180) to define the coil profile, for example by way of transfer pattern. Etching can occur, for example, by way of $O_2$ plasma etching. The person skilled in the art will understand that the geometry of the coils can be varied to meet the specification of different applications. The structure shown in FIG. 7(h) represents a whole piece. The two central voids (180) represent the inner holes of the coils of FIG. 2. The step described in FIG. 7(h) first removes excess parylene to define the coil shape. In addition, it creates the contact openings—see the two side voids (180)—by removing parylene on top of the contacts. Because plasma cannot penetrate metal, it will not etch the parylene under the metal contacts.

FIG. 7(i) shows a ninth step where the device is released from the silicon substrate (110), for example by dissolution of the photoresist sacrificial layer (100) in acetone or other solvents.

Many different metals and conductive polymers can be used as the electrically conducting material. Other parylenes, polymers or plastics, can be used as the insulating material instead of parylene C. Moreover, the thickness of the insulating layer can be varied for different application environments. The thickness of the metal layers can be any kind of thickness, e.g., 20 nm to 4 μm. The thickness of each polymer layer can range, for example, from 2 μm to 20 μm.

After the parylene-based skin is released from the substrate, the structure is folded, and then a thermal bonding process is performed in a vacuum oven to fuse the separate layers together. The vacuum oven is used to prevent the oxidation of parylene C, which could make parylene very fragile. The bonding temperature should be below the melting point of parylene C (typically about 290° C.), for example 200° C. for 2 days. Other mechanisms can be used to heat up parylene skins instead of the thermal method, such as microwave.

According to an embodiment of the disclosure, the coil shown so far can be specifically designed for intraocular retinal prostheses. A particular case of such embodiment provides for a coil having 28 turns of metal wires, and being 10 mm in outer diameter. The metal can be encapsulated by 9 μm of parylene C.

As already mentioned above, the person skilled in the art will understand that the techniques shown so far can also be used for coils having a number of layers greater than, two. In this case, alignment between layers during folding could become an issue if too many layers are made with this technique.

Figure 8:
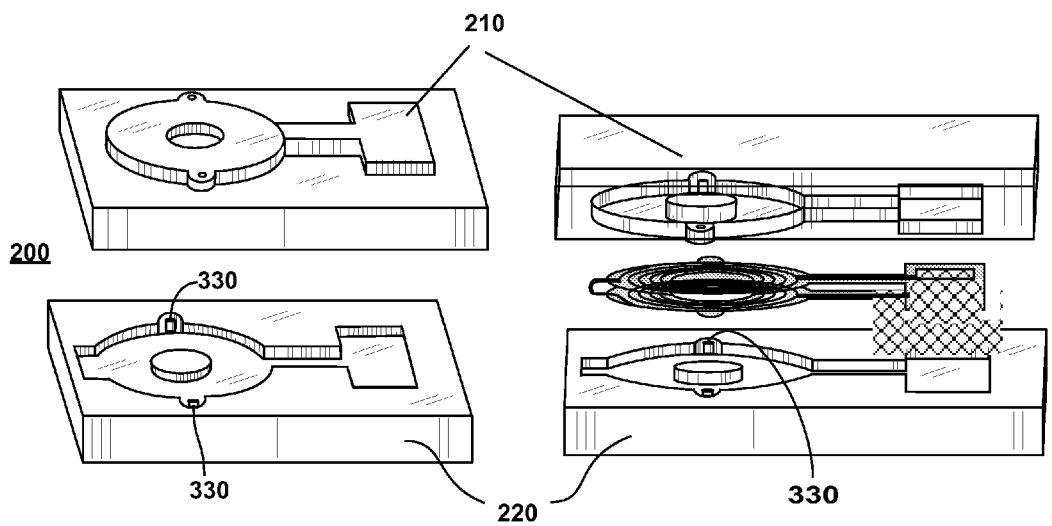
FIG. 8 shows perspective exploded views of a guiding and holding device (jig) for aligning and bonding layers of a multilayer coil.

In applications with a large number of such layers, a special jig (i.e. a guiding and holding device or mold for aligning and holding) matching the size of the coil can help to ensure good alignments. Good alignment is desired to achieve the maximum theoretically possible self-inductance (L2). Such self-inductance will drop down in presence of misalignment. FIG. 8 shows an example of such jig (200), which comprises a top metal piece (210) and a bottom metal piece (220) to allow the parylene skins to be aligned and sandwiched in between during the thermal bonding process. For example, the jig can be made of aluminum which does not stick to parylene C at high temperature, and allows the device to be easily peeled off after thermal bonding. Alternatively, the jig can be made of Teflon®. Additionally, to improve the thermal bonding process, clamping force or pressure can be applied on the jig. Alignment can occur through the presence of alignment holes (340) (see FIG. 1) adapted to match alignment poles (330) provided in the jig.

Figure 9:
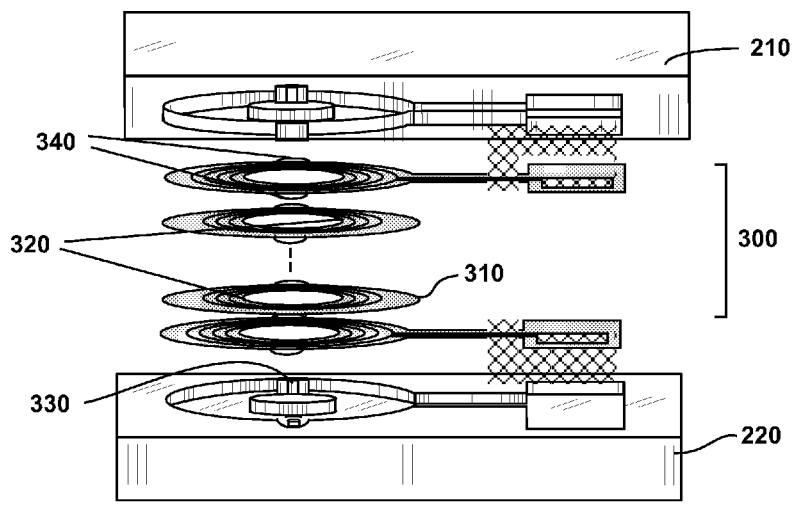
FIG. 9 shows a perspective exploded view of a stackable coil.

Stackable coils can be an alternative approach for making high-Q coils with multiple layers of metal. FIG. 9 shows a perspective schematical view of a stackable coil (300), in accordance with a further embodiment of the present disclosure. In this embodiment, each layer (310) of coil is fabricated individually with vertical interconnection vias (320) precisely positioned and fully opened. Then the parylene/metal skins are aligned and stacked together with the assistance of a matching jig (210), (220). Also in this case, small (e.g., 500 microns diameter) poles (330)—see also FIG. 8—can be built on the jig, to match the alignment holes (340) on the periphery of the coils (310). The parylene/metal skins (310) can be aligned by feeding the poles (330) through the holes (340). After that, a similar thermal treatment process in vacuum oven is used to bond the layers (310) together. Finally, silver paste can be filled into the open vias to build the interconnections between layers, while the top opening is sealed with biocompatible epoxy or parylene to render an implantable final device. Instead of silver paste, other conductive materials, such as conductive epoxy and solder can be used for making the contacts between layers.

Figure 10:
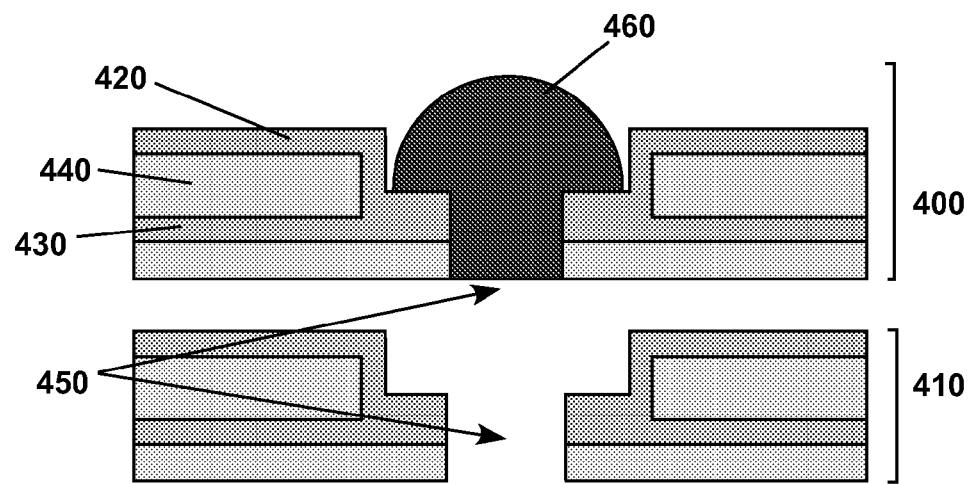
FIG. 10 shows a cross-sectional view of a vertical interconnection via with reference to a first layer and a second layer of a stacking coil.

FIG. 10 shows a cross-sectional view of a vertical interconnection via (320) with reference to a first layer (400) and a second layer (410) of a stacking coil. The structure is similar to that shown in FIG. 5, with a top metal layer (420), a bottom metal layer (430) and a parylene insulating layer (440), with the difference that this time a through hole (450) is present. Element (460) represents the soldering material (e.g., silver paste) that is used to fill the through holes (450) of the layers of the stack for forming electrical contact.

Figure 11:
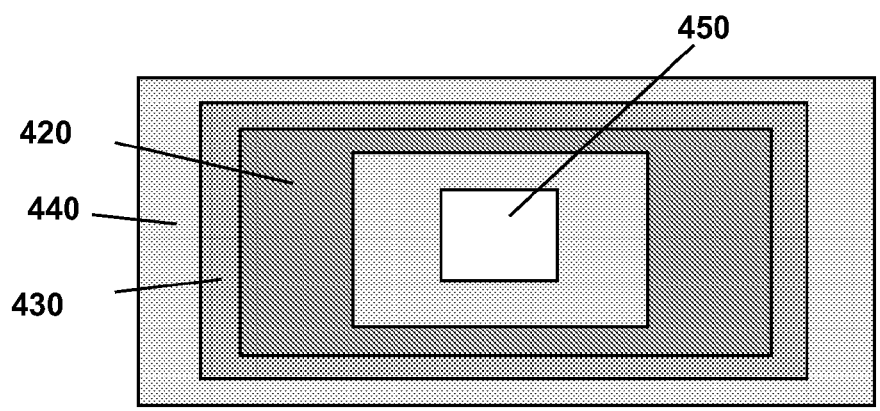
FIG. 11 shows a top sectional view of FIG. 10.

FIG. 11 shows a top sectional view of FIG. 10, where element (460) is not being shown for clarity purposes.

In summary, according to some of the embodiments of the present disclosure, a polymer-based foldable coil employing a multilayer polymer/metal thin film is shown. According to such embodiments, the device is completely made using microfabrication technologies, which are compatible with the existing processes developed for other system components, such as multi-electrode arrays. Microfabrication refers to processes for building miniature structures, with sizes in micronscale and smaller, such as photolithography, chemical vapor deposition (CVD), E-beam evaporation, oxygen plasma etching, and wet etching process. Because of the flexibility of parylene or some similarly flexible polymer, this thin film skin can be folded and bonded together to form a multiple layer structure using a post fabrication heat treatment. The geometry of the coil shown in such embodiments is determined by the dimension of the human eyeball, and this can be varied for other applications.

Accordingly, what has been shown is a foldable polymer-based coil structure and a method for fabricating the same. While the coil and the method have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

What is claimed is:

1. A foldable polymer-based coil structure, comprising:
a metal wiring arrangement comprising at least two spiral coils, each coil comprising at least two wire coil turns of diminishing diameter, and at least one interconnection between the coils, wherein the metal wiring arrangement is on a first metal layer of a substrate and the at least one interconnection is on a second metal layer of the substrate, the first and second metal layers being separated by an insulating layer in regions not corresponding to an interconnection therebetween; and
a polymer coating embedding the coils and the at least one interconnection,
wherein the at least one interconnection and a portion of the polymer coating embedding the at least one interconnection define at least one foldable region configured to be folded to obtain a folded layered structure where the coils overlap each other.

2. The foldable coil structure of claim 1, wherein the metal wiring arrangement further comprises metal contacts and interconnection vias connecting the metal contacts with the coils, wherein the polymer coating embeds, at least partially, the interconnection vias, and wherein, in the folded layered structure, a first layer metal contact is adjacent to a second layer metal contact, and a first layer interconnection via is adjacent to a second layer interconnection via.

3. The foldable coil structure of claim 2, wherein the metal wiring arrangement comprised of the coils, the at least one interconnection between the coils, the metal contacts and the interconnection vias is, before folding, a multiple-layered metal wiring arrangement.

4. The foldable coil structure of claim 3, wherein the multiple-layered metal wiring arrangement is a two-layered metal wiring arrangement.

5. The foldable coil structure of claim 4, wherein the two-layered metal wiring arrangement comprises a first layer including the coils, and a second layer including the at least one interconnection between the coils, the metal contacts and the interconnection vias.

6. The foldable coil structure of claim 1, wherein the folded layered structure comprises a first layer bonded to a second layer.

7. The foldable coil structure of claim 3, wherein each layer comprises vertical interconnection vias to form a connection between layers.

8. The foldable coil structure of claim 1, wherein the polymer is parylene.

9. The foldable coil structure of claim 8, wherein the parylene is parylene C.

10. The foldable coil structure of claim 1, wherein the coil structure is a radiofrequency coil structure.

11. An intraocular retinal prosthesis comprising the coil structure of claim 1, the coil structure being a receiving coil of the intraocular retinal prosthesis.

12. A polymer-based coil stack, comprising:
a plurality of coil structures stacked on each other, each coil structure comprising:
a metal wiring arrangement comprising a spiral coil having at least two wire coil turns of diminishing diameter;
a horizontal interconnection via connected with the coil;
a metal contact connected with the horizontal interconnection via;
a polymer coating embedding the coil and the horizontal interconnection via; and
a vertical interconnection via for connection to other coil structures of the stack,
wherein the metal wiring arrangement is on a first metal layer of a substrate and the horizontal interconnection is on a second metal layer of the substrate, the first and second metal layers being separated by an insulating layer in regions not corresponding to an interconnection therebetween.

13. A method for aligning a polymer-based coil stack, the method comprising:
(a) providing a jig;
(b) positioning a polymer-based coil stack in the jig, the coil stack comprising a plurality of coil structures stacked on each other, each coil structure comprising:
a metal wiring arrangement comprising a spiral coil having at least two wire coil turns of diminishing diameter;
a horizontal interconnection via connected with the coil;
a metal contact connected with the horizontal interconnection via;
a polymer coating embedding the coil and the horizontal interconnection via; and
a vertical interconnection via for connection to other coil structures of the stack,
wherein the metal wiring arrangement is on a first metal layer of a substrate and the horizontal interconnection is on a second metal layer of the substrate, the first and second metal layers being separated by an insulating layer in regions not corresponding to an interconnection therebetween;
(c) thermally bonding the coil structures of the coil stack.

14. The method of claim 13, wherein each coil structure comprises alignment holes and wherein the jig comprises alignment poles where the alignment holes are inserted.

15. The foldable coil structure of claim 1 forms, prior to folding into a layered structure, a flexible thin film.

16. The foldable coil structure of claim 15, wherein a thickness of the thin films is between 1 micron and 30 microns.

17. The foldable coil structure of claim 15, wherein Young's modulus of the polymer is about 4 GPa.

18. The coil stack of claim 12, wherein the vertical interconnections have alternating orientations between adjacent layers of the stack.

* * * * *